United States Patent [19]
Tachibana et al.

[11] Patent Number: 6,074,510
[45] Date of Patent: Jun. 13, 2000

[54] METHOD FOR ADHERING TOGETHER MEMBERS MOLDED FROM SYNTHETIC RESIN

[75] Inventors: Yoshiaki Tachibana; Masanobu Deguchi; Kunihiro Tamahashi; Jun Nagata, all of Hitachinaka, Japan

[73] Assignee: Hitachi Koki Co., Ltd., Tokyo, Japan

[21] Appl. No.: 09/138,363

[22] Filed: Aug. 21, 1998

[30] Foreign Application Priority Data

| Aug. 21, 1997 | [JP] | Japan | 9-225017 |
| Oct. 9, 1997 | [JP] | Japan | 9-276971 |
| Apr. 30, 1998 | [JP] | Japan | 10-121015 |

[51] Int. Cl.$^7$ .................................. B21D 53/76
[52] U.S. Cl. .................... 156/245; 156/290; 156/292; 156/310; 156/314; 156/330; 29/890.1
[58] Field of Search ....................... 156/290, 292, 156/330, 335, 245, 310, 314; 29/890.1

[56] References Cited

U.S. PATENT DOCUMENTS

| 4,678,711 | 7/1987 | Atkins | 156/330 |
| 4,929,505 | 5/1990 | Washburn | 156/92 |
| 5,221,397 | 6/1993 | Nystrom | 156/315 |
| 5,506,039 | 4/1996 | Kimura | 428/218 |
| 5,698,057 | 12/1997 | Abouzahr | 156/307.1 |
| 5,958,166 | 6/1999 | Walters | 156/94 |

*Primary Examiner*—Jeff H. Aftergut
*Attorney, Agent, or Firm*—Whitham, Curtis & Whitham

[57] ABSTRACT

The same material as the molded members is dissolved in solvent. The solvent is evaporated to form an adhesive layer. The molded members are adhered together via the adhesive layer. The molded members and the adhesive layer are heated and fused together to produce an ink jet head having a monocoque structure formed from a single material including the adhesive layer.

7 Claims, 3 Drawing Sheets

METHOD FOR ADHERING TOGETHER MEMBERS MOLDED FROM SYNTHETIC RESIN

BACKGROUND OF THE INVENTION

1. Field of the Invention

The present invention relates to a method for adhering together components that are molded from synthetic resin.

2. Description of the Related Art

A component cam be produced from synthetic resin to have an intricate interior structure by first forming a plurality of simple parts and then adhering the parts together into an integral unit to form the synthetic resin component. One example of a synthetic resin component with an intricate interior structure is an ink jet head used in an ink jet printer. Ink jet heads eject ink droplets having a very small volume of about 30 pl to 100 pl. Therefore, ink jet heads must have ink chambers for holding with an extremely small volume of the ink liquid.

Here, an explanation will be provided for manufacture of an ink Jet head used in an ink jet printer. The nozzle portion of the ink jet head is formed from an oscillation member and a molded member as well as other members. The molded member includes ink chambers for holding ink and nozzles through which the ink is elected. First, each of these different members is formed by injection molding techniques. Then, the members are adhered together using an adhesive.

It has also been proposed to produce a doped cement for use as the adhesive by dissolving the same material as that of the molded member in a solvent. When this method is used, solvent remains in the adhesive when the two members are adhered together. The solvent is totally evaporated after the two members are adhered together. However, bubbles are always generated in the adhesive layer when the solvent is evaporated In this manner. These bubbles degrade sealing characteristic of the adhesive. Therefore, this method of connecting members together is not well-suited for applications, such as ink jet heads, which require a complete seal over areas 80 microns wide. Further, this method results in only a relatively weak connection between the two pieces adhered together.

The adhesive used to connect together two molded resin pieces is generally produced by specialist companies. Generally, such adhesive is made from a material different from the material of the molded pieces. However, because ink jet heads have such a complicated and intricate structure, when two or more pieces are fixedly connected together to produce an integral head, a variety of problems regarding adhesive strength and precision arise because the characteristics of the adhesive layer are different from the characteristics of the resin member. For example, the pieces can separate from each other. Also, the difference between thermal expansion of the members and the adhesive, residual adhesive warping of the completed component, and adhesive sticking out from between the adhered members are problems relating to adhesive strength and precision.

Resin members with intricate structures are often adhered together using an adhesive formed in a sheet shape. However, the adhesive has low resistance to corrosion by ink.

Heads are often formed in an integral shape, that is, with a monocoque structure, using injection molding or blow molding techniques. However, these techniques not suitable for forming print heads with intricate and complicated structures.

The component resulting from adhering a plurality of resin members together and having intricate and complex sealed construction must have a complete seal at the adhesive layer portion.

SUMMARY OF THE INVENTION

It is an object of the present invention to eliminate problems that often occur when two or more resin members are adhered together and to produce a component having a monocoque structure using an adhesive layer with the same physical characteristics as the adhered pieces.

To achieve the above and other objects, the present invention provides a method of adhering together two members formed from the same synthetic resin material. In the method, the two members are formed at a forming temperature. On an attachment surface of at least one of the two members is formed an adhesive layer from the synthetic resin material of the two members. The two members are pressed together with the adhesive layer therebetween. The two members and the adhesive layer are heated to at least the forming temperature to fuse the two members into an integral unit.

When the two members are formed, they are formed at a cross-linking temperature or less.

To form the adhesive layer the attachment surface is coated with a powder of the synthetic resin, preferably by way of at least one of electrostatic painting, spin coating, silk printing, and transferring. Alternatively, the attachment surface can be coated with a sheet of the synthetic resin. The adhesive layer may be formed by coating the attachment surface of the at least one of the two members with a solvent including the synthetic resin material, and heating the solvent to a temperature equal to or less than the forming temperature to evaporate the solvent. In this case, the attachment surface may be coated with a volatile solvent.

When the two members and the adhesive layer are heated, they are heated to at least the cross-linking temperature to fuse and harden the two members into an integral unit.

It is preferable that the attachment surface of the at least one of the two members be activated after the step of forming the adhesive layer and before the step of heating the two members and the adhesive layer. In this case, It is desirable to mask surfaces other than the attachment surface.

In activating the attachment surface, plasma asher and oxygen can be applied while performing at least one of irradiation with ultraviolet light and chemical processes.

In forming the two members and forming the adhesive layer, the two members and the adhesive layer are formed from at least one of phenolic plastic and epoxy resin.

The above-described method can be applied to producing an ink jet head having a vibration member and a form member adhering together two members formed from the same synthetic resin material.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A method for producing an ink jet head according to a preferred embodiment of the present invention will be described while referring to the accompanying drawings.

Figure 1:
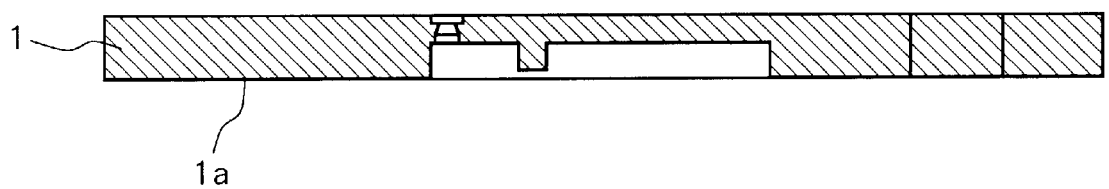
FIG. 1 is a cross-sectional view showing a nozzle-side molded member of an ink jet head according to the present invention.
Figure 2:
FIG. 2 is a cross-sectional view showing an ink-chamber-side molded member of the ink jet head.
Figure 3:
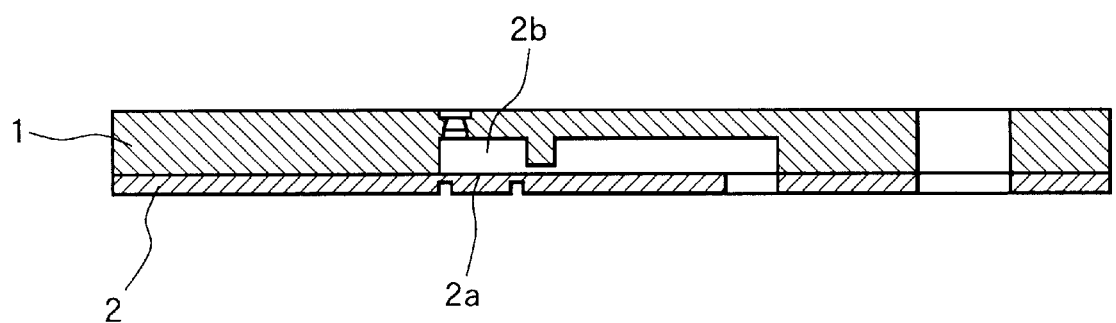
FIG. 3 is a cross-sectional view showing the molded members of FIGS. 1 and 2 adhered together.

FIG. 1 shows a nozzle-side molded member 1 of the ink jet head. FIG. 2 shows an ink-chamber-side molded member 2 of the ink jet head. Both molded members 1, 2 are formed from a synthetic resin material. FIG. 3 shows the nozzle-side molded member 1 and the ink-chamber-side molded member 2 adhered to each other. As shown in FIG. 3, ink chambers 2b are formed by attaching the molded members 1, 2 together.

An explanation will be provided regarding a method of producing the component shown in FIG. 3 by fixedly adhering together the molded members 1, 2, which have the intricate and complicated forms shown in FIGS. 1 and 2. First, the adhesive used to adhere the molded members together is produced by mixing the same material as that of the molded members 1, 2 in an appropriate solvent. After the resin material is fully dissolved and dispersed in the solvent, the resultant resin material solution is uniformly coated onto attachment surfaces of the molded member 1, 2 to form adhesive layers 1a, 2a, respectively. Then, the two molded members 1, 2 are oriented with the adhesive layers 1a, 2a facing each other and pressed together. This completes the adhering process.

Here, the method of producing the component shown in FIG. 3 will be explained in more detail. According to the present embodiment, the molded members 1, 2 are formed from phenolic resin. Phenolic resin has a molding temperature of 100 to 110° C. and a cross-linking temperature of 180° C. The molding temperature is the temperature at which the resin melts into a liquid that is easily molded. To produce the adhesive layers 1a, 2a, first a powder of phenolic resin that has not yet been heated to the molding temperature is mixed or dissolved in a solvent of either methyl ethyl ketone or an alcohol. Examples of alcohols suitable for the solvent of the present embodiment include isopropyl alcohol, acetone, or monoethanol amine.

Next, a small amount of resin/solvent solution is uniformly coated on the attachment surfaces of the molded members 1, 2. Next, drying operations are performed to completely evaporate the solvent from the adhesive surfaces.

After drying, a thin adhesive layer remains on the attachment surfaces. At this point, cross-linking in the thin adhesive layer has not yet been progressed. Also, bubbles generated in the adhesive layer and remain in the adhesive layer in the form of tiny holes.

Next, the molded members 1, 2 are assembled and compressed together while heated to melt the resin of the adhesive layers 1a, 2a together. Because the adhesive layers 1a, 2a are melted together the molded members 1, 2 will be adhered together uniformly with no gaps. Because the molding temperature of phenolic resin is 100 to 110° C. the adhesive layers 1a. 2a can be fused together by heating to about 120° C.

At this time the molded members 1, 2 will not melt because the molded members 1, 2 have been already heated to the molding temperature once. However, the adhesive layers 1a, 2a, which have not yet been heated to the molding temperature, will be melted by being heated to about 120° C. so that the molded members 1, 2 can be properly adhered to each other with a good seal in therebetween.

Adhesive can be coated in a proper amount on the molded members 1, 2 by using spin coating, silk printing transfer, or powder coating methods, whichever method is the most suitable. Alternatively, the adhesive can be heated at a low temperature to form a sheet-shape adhesive, which can be used to form the adhesive layer.

According to the present embodiment, the molded members 1, 2 are adhered together at the narrowest portion of walls that partition adjacent ink chambers 2b from each other. The attachment surface on these partition walls has an extremely narrow width of 50 to 100 μm. However, by applying the adhesive in a thin layer of about 0.3 μm to 15 μm thick to these attachment surfaces, the molded members 1, 2 can be adhered together with sufficient strength, but without residual adhesive protruding from in-between the molded members 1, 2.

There is no need to use solvent when adhering the molded members 1, 2 together. Instead, the same material used to form the molded members 1, 2 is pulverized into a powder and the powder is coated onto the attachment surfaces of the molded members 1, 2 using electrostatic coating. Next, the molded members 1, 2 are pressed together and heated to melt the adhesive layers together. Such a powdered adhesive layer can also be coated on the molded members 1, 2 using spin coating or printing techniques, or can be attached in a sheet form.

Alternatively, the same synthetic resin material as that of the molded members 1, 2 can be pulverized into a powder and the powder dissolved in a highly volatile liquid. In this case, to coat the adhesive onto the attachment surfaces of the molded members 1, 2, the resultant solution can be sprayed from an atomizer nozzle onto the attachment surfaces in an atomized spray. Afterward, the attachment surfaces of the molded members are pressed together and the molded members 1, 2 are heated, thereby fusing the powder layer and the molded members together. In this way, the powder of synthetic resin operates as an adhesive.

The adhesive layer 1a, 2a can be formed by activating the attachment surfaces of the molded members 1, 2. By doing so, the resultant attachment between the molded members 1, 2 can further be strengthened. Suitable treatments for activating the attachment surfaces include plasma asher and chemical processing.

The attachment surfaces of the molded members 1, 2 can be selectively activated using plasma asher by first applying a mask over portions which are not to be adhered together. Afterward, the resultant adhesive layers 1a, 2a of the molded members 1, 2 can be pressed together and heated to melt the adhesive layers 1a. 2a together, thereby forming the molded members 1, 2 into an integral unit.

Other methods besides plasma asher can be used to activate the attachment surfaces and achieve the same effects as described above. For examples the attachment surfaces can be activated by irradiating them with ultraviolet light in an atmosphere of oxygen. Also, the attachment surfaces can be activated using chemical processes. For example, carbon and carbon compounds can be removed from the attachment surface, and the attachment surface can be activated and roughened by using a solvent, a strong acid, or a base.

Here, an example will be provided for attaching the molded members 1, 2 without adhesive. First, a resin material that has not undergone cross-linking is heated to the molding temperature and the molded members 1, 2 are formed therefrom. At this point, a certain amount of cross-linking has occurred in the resin material of the molded members 1, 2. Next, the attachment surfaces are activated using the physical or chemical processes described above to return the attachment surfaces to the non-cross-linked state, thereby forming the adhesive layers 1a, 2a. Then, the molded members 1, 2 are heated again to melt and adhere the adhesive layers 1a, 2a together.

Using this method, components making up a complex and extremely small ink jet head can be adhered together with extreme precision and without defects. Even when the width of the attachment surfaces is only 50 μm to 100 μm, such as the case near the ink chambers 2b, adhesive can be coated in, just the right amount. Problems, such as adhesive protruding between the molded members 1, 2, insufficient amount of adhesive, or variation in adhesive thickness, can be prevented.

After the molded members 1, 2 are adhered together, the resultant structure is heated to a higher temperature than the molding temperature in order to vitiate a sufficient amount of cross-linking in the resin to produce a more chemically stable structure. When the molded members 1, 2 are formed from phenolic resin, heating the adhered molded members 1. 2 to 180° C. is sufficient. It should be noted that instead of phenolic resin, the synthetic resin material used for producing the molded members 1, 2 can be epoxy resin or another thermally hardened resin, or a liquid crystal polymer.

The molded members 1, 2 can be protected from corrosion which might occur when the molded members 1, 2 are stored with or contacted by corrosive liquids, gases or solid materials, by completely by sintering the molded members 1, 2 to produce an amorphous carbon shell that seals out the corrosive materials. Amorphous carbon is a very stable material. Further, by changing the adhesive layer into amorphous carbon in the same manner, a monocoque structure head can be produced.

Here, an explanation will be provided for producing a monocoque structure head from amorphous carbon. When the head is to be produced from amorphous carbon, the integrally attached molded members 1, 2 are sintered in an oven at about 1000° C. in an atmosphere of an inert gas. As a result, the integral unit including the adhesive layer will change into a completely amorphous state. Accordingly, an amorphous carbon head having a monocoque structure with extremely good performance can be prepared, wherein the adhesive layer is sufficiently resistant to ink.

Figure 4:
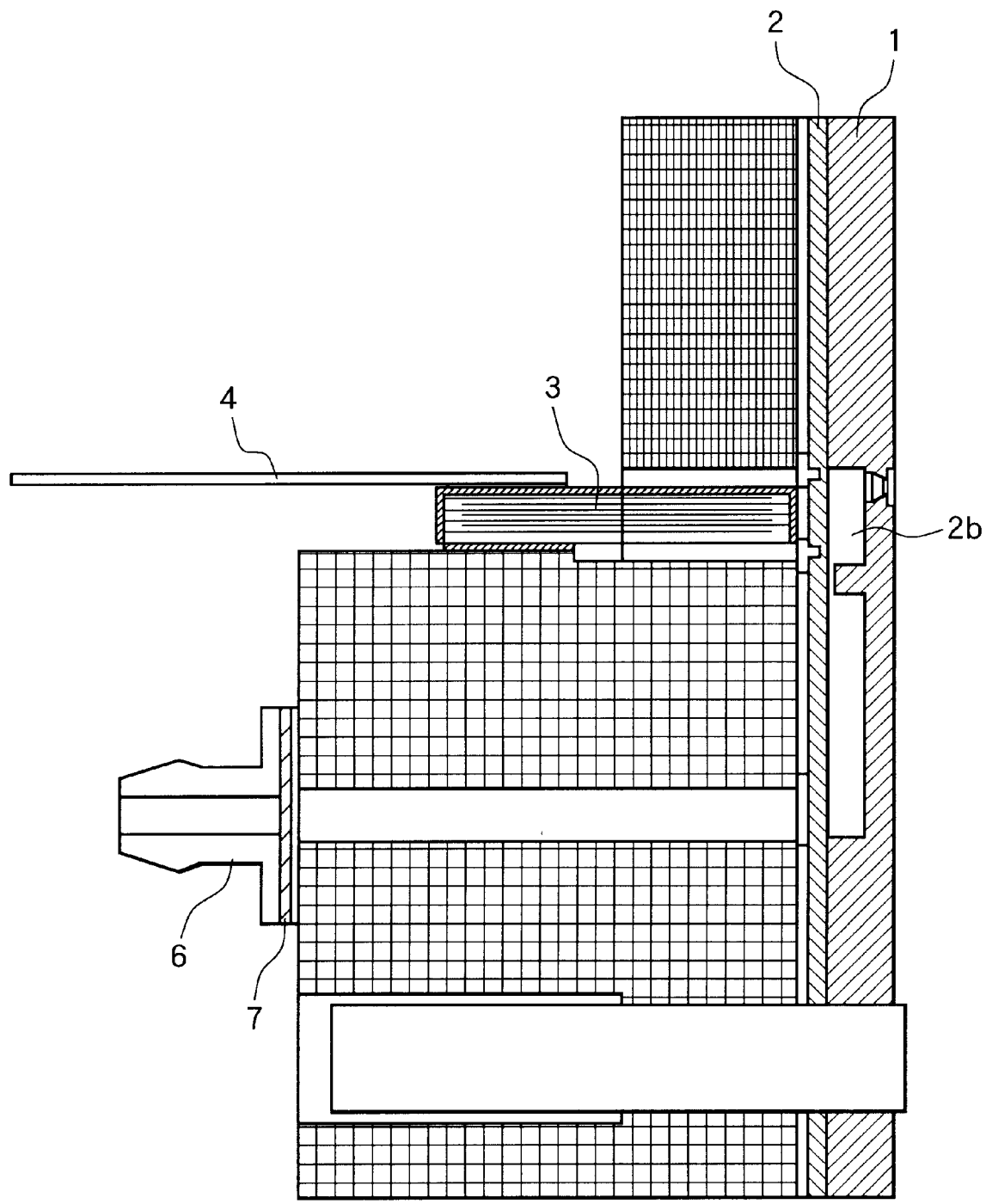
FIG. 4 is a cross-sectional view showing the adhered members incorporated into the ink jet head.

FIG. 4 shows an ink Jet head produced by assembling together the molded members 1, 2, a piezoelectric actuator 3, a power circuit 4 for driving the actuator 3, a holder/ink passage 6, and an ink tube connector/filter 7.

Figure 5:
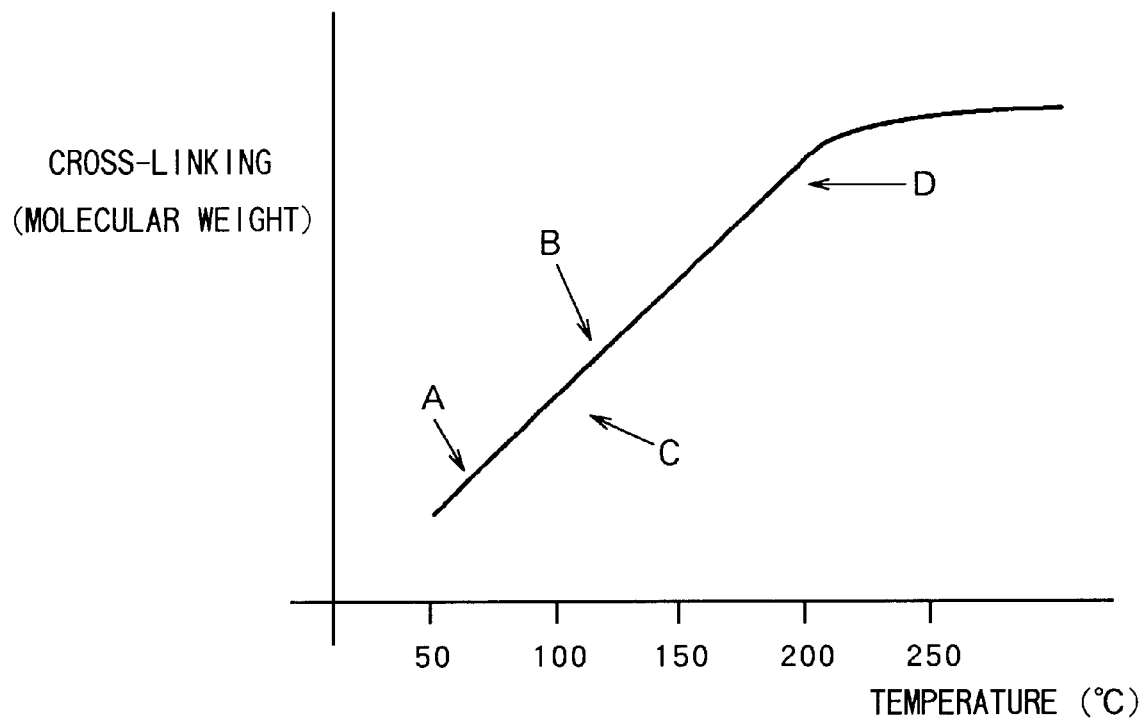
FIG. 5 is a graph showing the relationship between temperature and condition of material used in forming the molded members.

FIG. 5 is a chart showing the relationship between cross-linking and temperature. The subject of cross-linking used to prepare this graph is the phenolic resin used to form the molded members 1, 2.

No cross-linking will occur when resin pellets are heated to only temperature A (70 to 90° C.) Temperature C. (100 to 120° C.) is the molding temperature of the resin. At the molding temperature C., the resin pellet will melt into a liquid with an extremely small viscosity. When held at the molding temperature, the resin will slowly cross-link, eventually turning into a gel and then a solid. However, cross-linking occurs over a time inversely proportional to the temperature of the resin so if the resin is heated above the molding temperature to a temperature B (120 to 140° C.), the cross-linking process will be accelerated so that the resin solidifies into a gel more rapidly. The difference between temperature C. and temperature B Only 20 to 30° C.

After the molded members 1, 2 have been molded, the molded member 1, 2 are heated to a higher temperature until cross-linking occurs to a certain extent and the molded members 1, 2 are in a solid state. Then,1 adhesive layers 1a 2a are formed, either from a powdered of e resin pellets or, by activating the attachment surfaces of the molded members 1, 2 to return the attachment surfaces to the non-cross-linked condition of the resin pellets at temperature A.

Next, the molded members 1, 2 and the adhesive layers 1a, 2a are pressed together and heated to near temperature B. This changes the adhesive layers 1a 2a only to a gel or liquid state. By further heating to over temperature D (170 to 250° C.), the adhesive layers 1a, 2a fuse with non-cross-linked attachments surfaces of both the molded members 1, 2. Cross-linking occurs sufficiently so that the pair of molded members 1, 2 are adhered to form an integral unit from a single material. It should be noted that if the temperature is raised rapidly to temperature D, the time at which the resin is in the liquid and gel states will be much shorter and the resin will solidify much more rapidly.

Even if adhesive layers are formed on portions of the molded members other than the attachment surfaces, that is, on portions that should not be adhered together, such as open portions, these adhesive layers will not adhere to anything as long as nothing is pressed against them. In other words, when an activated surface is heated back into an adhesive state, even if a surface is in contact with the activated surface, as long as the two surfaces are not pressed together, then all that will happen is that cross-linking will proceed in the activated surface until the activated surface becomes an integral part of the corresponding member. The activated surface will not appear as extraneous material on the surface of the corresponding member and so will not interfere with flow of ink, for example. Further, adhesive will not protrude from between the molded member 1, 2. Therefore, the present invention is suitable for extremely intricate adhering situations.

Desired performance could not be achieved heretofore because adhesive was formed from a material different from that of the molded members adhered together by the adhesive. The present invention improves on this conventional situation by enabling production of a structure with strength and sealing characteristics equivalent to those of a monocoque structure.

Although the above-described embodiment is directed to production of an ink jet head, the present invention can be applied to different technological fields. Also, the resin used in the injection molding process can be another resin than the one described above. For example, PET, PBT, PC, ABS. AS or other thermoplastic resin can be used.

Because the adhesive layers and the folded members are formed from the same material, they con be formed into an integrated unit. Molded components having the same characteristics as an integrally formed unit can be obtained even in complicated configurations with hollow spaces inside, which are impossible to produce on an industrial scale using conventional techniques. For example, when the present invention is applied to production of an ink jet head, because the entire structure is formed from a single chemically stable material, ink and other liquids that tend to be corrosive, staining, or chemically active can be introduced into the interior of the structure without fear of the liquid Further, even if the structure expands or contracts due to changes in the ambient temperature and humidity, it is unlikely that the structure will undergo any stress from differences in expansion rates because the entire structure is made from the same material. Therefore, the structure is highly reliable and the present invention is well suited for application to hot melt ink jet heads that must be heated to high temperatures to melt the hot melt ink.

When the structure is sintered to form an amorphous structure, because the adhesive is formed from the same material, the structure will form an integral unit having a monocoque structure.

Because the structure is formed from only a small number of components, only a few processes are needed to produce the structure. Therefore, there is less opportunity for erroneous operations and processes to occur. This results in a structure that is highly reliable and that has a long life. Also, the structure can be made inexpensively because it includes only a few components. Because a multi-nozzle print head can be easily formed, speed and performance can of be improved easily.

What is claimed is:

1. A method of adhering together two members formed from the same synthetic resin material, the method comprising the steps of:

forming the two members at a forming temperature;

forming on an attachment surface of at least one of the two members, an adhesive layer including the same synthetic resin material of the two members;

pressing together the two members with the adhesive layer therebetween; and heating the two members and the adhesive layer to at least the forming temperature to fuse the two members into an integral unit.

2. A method as claimed in claim 1, wherein the step of forming the two members comprises forming the two members at a cross-linking temperature or less.

3. A method as claimed in claim 1, wherein the step of forming the adhesive layer comprises the steps of:

coating the attachment surface of the at least one of the two members with a solvent including the synthetic resin material; and heating the solvent to a temperature equal to or less than the forming temperature to evaporate the solvent.

4. A method as claimed in claim 3, wherein the step of coating comprises coating the attachment surface with a volatile solvent.

5. A method as claimed in claim 1, wherein the steps of forming the two members and forming the adhesive layer comprise forming the two members and the adhesive layer from at least one of phenolic plastic and epoxy resin.

6. A method of producing an ink jet head having a vibration member and a form member adhering together two members formed from the same synthetic resin material, the method comprising the steps of:

forming the vibration member and the form member at a forming temperature;

forming, on an attachment surface of at least one of the vibration member and the form member, an adhesive layer including the same synthetic resin material of the vibration member and the form member;

pressing together the vibration member and the form member with the adhesive layer therebetween; and heating the vibration member and the form member to at least the forming temperature to fuse the vibration member and the form member into an integral unit.

7. A method as claimed in claim 6, further comprising a step of sintering the integral unit of the vibration member and the form member in an atmosphere of inert gas.

* * * * *